United States Patent

Funada

[11] Patent Number: 6,066,917
[45] Date of Patent: *May 23, 2000

[54] PLASMA DISPLAY PANEL

[75] Inventor: Hiroshi Funada, Tokyo-To, Japan

[73] Assignee: Dai Nippon Printing Co., Ltd., Japan

[*] Notice: This patent is subject to a terminal disclaimer.

[21] Appl. No.: 09/146,332

[22] Filed: Sep. 2, 1998

Related U.S. Application Data

[63] Continuation of application No. 08/703,351, Aug. 26, 1996, Pat. No. 5,838,106.

[30] Foreign Application Priority Data

Aug. 28, 1995 [JP] Japan ................................ 7-218631

[51] Int. Cl.⁷ .................................................. H01J 17/49
[52] U.S. Cl. ......................... 313/587; 313/581; 313/586; 313/112
[58] Field of Search .................... 313/581, 587, 313/489, 42, 582, 584, 585, 586, 485, 493, 496, 491, 112, 111

[56] References Cited

U.S. PATENT DOCUMENTS

| | | | |
|---|---|---|---|
| 3,953,756 | 4/1976 | Monfroy et al. ............. | 313/220 |
| 4,626,071 | 12/1986 | Wada et al. ............... | 350/311 |
| 4,692,662 | 9/1987 | Wada et al. ............... | 313/493 |
| 4,741,963 | 5/1988 | Wada et al. ............... | 428/428 |
| 4,803,402 | 2/1989 | Raber et al. .............. | 313/509 |
| 5,086,297 | 2/1992 | Miyake et al. ............. | 30/759 |
| 5,182,489 | 1/1993 | Sano ...................... | 313/485 |
| 5,336,121 | 8/1994 | Baret ..................... | 445/25 |
| 5,396,149 | 3/1995 | Kwon ...................... | 313/586 |
| 5,543,685 | 8/1996 | Okamoto et al. ........... | 313/496 |
| 5,654,727 | 8/1997 | Lepselter ................. | 345/60 |

FOREIGN PATENT DOCUMENTS 0 166 372  1/1986  European Pat. Off. .

OTHER PUBLICATIONS

Patent Abstracts of Japan, vol. 16, No. 160 (P–1340), Apr. 20, 1992 & JP 04 011202 A (Oki Electric Ind. Co., Ltd.) Jan. 16, 1992.

Patent Abstracts of Japan, vol. 18, No. 139 (E–1519), Mar. 8, 1994 & JP 05 325793 A (Dai Nippon Printing Co, Ltd.), Dec. 10, 1993.

T. Takano et al., A 25–in High–Contrast Color DC–PDP, SID 92 Digest, pp 720–723 Dec. 1992.

"Plasma Displays" by Shigeo Mikoshiba, Sid Seminar Lecture Notes, May 21, 1993, pp. F–2/3–F–2/31.

*Primary Examiner*—Ashok Patel
*Attorney, Agent, or Firm*—Parkhurst & Wendel, L.L.P.

[57] ABSTRACT

In the provision of a color filter on a front plate comprising a substrate 1, electrodes (4, 5) provided on the substrate, a dielectric layer 6 provided on the electrodes, and a protective layer 7 provided on the dielectric layer, a specific color filter is provided on the substrate 1, between the electrode 5 and the first dielectric layer 6*a*, or between the first dielectric layer 6*a* and the second dielectric layer 6*b*, or between the second dielectric layer 6*b* and the protective layer 7. By virtue of this constitution, troubles, such as breaking or unacceptable shape of edge, are not caused in the formation of the electrodes.

1 Claim, 5 Drawing Sheets

PLASMA DISPLAY PANEL

This is a Continuation of application Ser. No. 08/703,351 filed Aug. 26, 1996 now U.S. Pat. No. 5,838,106.

BACKGROUND OF THE INVENTION

The present invention relates to a plasma display panel (hereinafter often referred to as "PDP") which is a plate display of a self-activation luminescence type using gas discharge, and more particularly to PDP with a color filter provided on a front plate.

In general, PDP comprises two opposed glass substrates, a pair of electrodes systematically arranged in the glass substrates, and a gas (mainly Ne or the like) sealed therebetween. A voltage is applied across the electrodes to produce discharge within minute cells around the electrodes to emit light from each cell, thereby displaying information. Systematically arranged cells are selectively subjected to discharge luminescence in order to display information. Such PDPs are classified into two types, a direct current type PDP, wherein electrodes are exposed to a discharge space (DC type), and an alternating current type (AC type) wherein electrodes are covered with an insulating layer. Each of these types is further classified into a refresh drive system and a memory drive system according to display functions and memory drive systems.

FIG. 1 is an embodiment of the construction of an AC type PDP. In the drawing, the front plate and the back plate are shown separately from each other. As shown in the drawing, two glass substrates 1, 2 are arranged parallel and opposite to each other. Both the substrates are disposed so as to be held while leaving a given space therebetween with the aid of barrier ribs 3 provided, parallel to each other, on the glass substrate 2 as a back plate. Composite electrodes each comprising a transparent electrode 4 and a bus electrode 5 as a metallic electrode are provided parallel to each other on the back side of the glass substrate 1 as the front plate, and a dielectric layer 6 is provided so as to cover the composite electrode. Further, a protective layer 7 (MgO layer) is provided on the surface of the dielectric layer 6. On the other hand, address electrodes 8 are provided between the barrier ribs 3 on the front side of the glass substrate 2 as the back plate so that the address electrodes 8 are parallel to each other and orthogonal to the composite electrodes. Further, a phosphor 9 is provided so as to cover the wall surface of the barrier ribs 3 and the bottom face of cells.

The AC type PDP is of a plane discharge type and constructed so that an alternating voltage is applied across the composite electrodes on the front plate and an electric field leaked in the space produces discharge. In this case, since alternating voltage is applied, the direction of the electric field changes according to the frequency. Ultraviolet light produced by the discharge permits the phosphor 9 to emit light, and light passed through the front plate is viewed by an observer.

Regarding such color PDP, the present inventor has proposed various modifications. However, at the present time, color PDP having satisfactorily good contrast could have not been developed due to unsatisfactory brightness of the PDP per se.

For example, according to the present inventor's finding, reducing the reflectance to improve the contrast is effective in improving the visibility of an image on the display, and methods which are considered effective for realizing this include:

(a) a method wherein ND (neutral density) filter properties are imparted to the front plate;

(b) a method wherein $Nd_2O_3$ is placed in the front plate to exhibit an absorption property in a region other than a primary region of the spectrum of the phosphor;

(c) a method wherein the place other than the phosphor layer is filled with a low-reflectance material, that is, a method wherein a black matrix is formed;

(d) a pigment is incorporated into the phosphor layer;

(e) a pigment layer is formed in front of the phosphor layer;

(f) a color filter is provided which, corresponding to cells for red, green, and blue, is permeable to only a single wavelength of a luminescence spectrum.

Since, however, PDP, unlike CRT, has no sufficient margin for the brightness, the formation of a black matrix (method (c)) and the formation of a color filter (method (f)) are considered effective for increasing the contrast while minimizing the reduction of the brightness. For color PDP, in order to provide a satisfactory angle of visibility, it is necessary to provide the black matrix and the color filter on the inside of the front plate. For this purpose, however, the color filter should withstand a temperature of about 450 to 600° C. or a higher temperature and emit no gas in the course of the substrate production process. In this respect, the color filter, for a liquid crystal display device, in current use as such cannot be used in the above-described modified methods.

(i) The formation in advance of a color filter using a color glass paste or a glass paste with an inorganic pigment dispersed therein on a glass substrate as a front plate by printing for the formation of a thick film, or (ii) the formation in advance of a color filter by photolithography using the above paste, to which photosensitivity has been imparted, followed by the formation of a composite electrode, a dielectric layer, and a protective layer thereon is considered as a method for overcoming this problem associated with the provision of a color filter of three colors, red, green, and blue in PDP having the above construction.

In the above PDP, for structural reasons, the pattern of the color filter provided on the front plate should be parallel to the pattern of the phosphor of the opposed back plate, meaning that the pattern of the composite electrode (transparent and bus electrodes) of the front plate and the pattern of the color filter intersect each other at 90°. Further, since the thickness of the color filter is 2 to 10 μm, when the color filter is formed directly on the glass substrate, the electrode should be laid across a difference in level (2–10 μm) between the pattern portion and the non-pattern portion of the color filter.

In the above composite electrode, the formation of the transparent electrode by vacuum deposition or by sputtering is preferred from the viewpoint of forming a good thin film. However, when the transparent thin film electrode is formed on the color filter, the formation thereof across the difference in level of 2 to 10 μm without creating breaking is very difficult. Further, in the formation of the bus electrode on the difference in level, the presence of the difference in level poses a further problem that the thickness, line width, and shape of the edge of the electrode are affected by the difference in level, resulting in unstable operation.

DISCLOSURE OF THE INVENTION

In view of the above problems, the present invention has been made, and an object of the present invention is to provide PDP having a construction which enables a color filter to be stably formed on a front plate without creating breaking of a transparent electrode and the like, and a process for preparing the same.

In order to attain the above object, the present invention provides a plasma display panel comprising: a front plate; and a back plate disposed parallel and opposite to the front plate, the front plate comprising a transparent substrate for the front plate, electrodes provided at a given interval on the transparent substrate, a dielectric layer provided so as to cover the electrodes, and a protective layer provided on the dielectric layer, the back plate comprising a transparent substrate for the back plate and barrier ribs provided at given intervals on the transparent substrate, the barrier ribs defining a plurality of cells as a display element, a color filter being provided (a) on the transparent substrate of the front plate so as to cover the electrodes, (b) within the dielectric layer of the front plate, (c) between the dielectric layer and the protective layer of the front plate, or (d) on the surface of the transparent substrate of the front plate and between the transparent substrate and the electrodes.

BEST MODE FOR CARRYING OUT THE INVENTION

Figure 2:
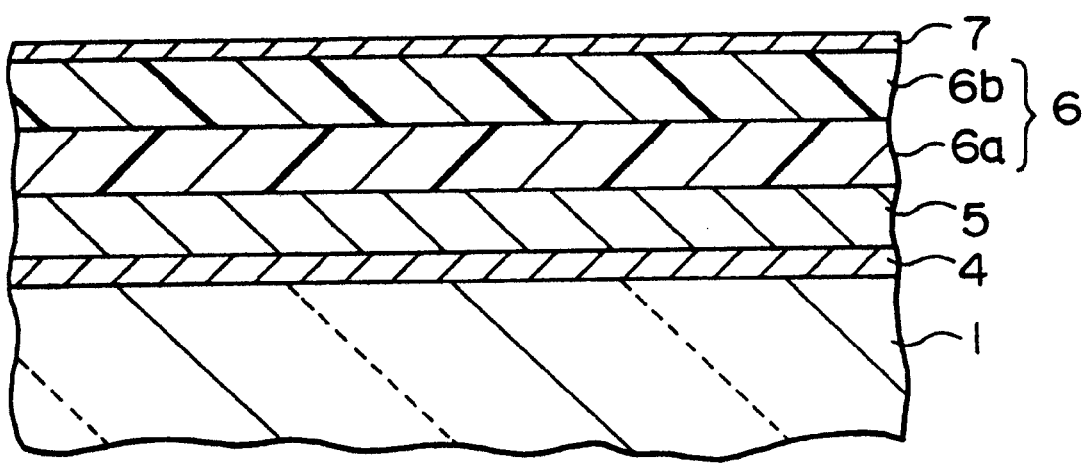
FIG. 2 is a cross-sectional view of a front plate on which a color filter is to be formed.

FIG. 2 is a cross-sectional view showing a front plate of PDP not having a color filter. In the drawing, numeral 1 designates a transparent substrate, numeral 4 a transparent electrode, numeral 5 a bus electrode, numeral 6a a first dielectric layer, numeral 6b a second dielectric layer, and numeral 7 a protective layer (MgO layer). In the present embodiment, in order to satisfy the percentage aperture and the electrical conductivity, a composite electrode comprising a transparent electrode 4 and a bus electrode 5 is used as the electrode for the front plate. If there is a single material satisfying both of these requirements, the electrode for the front plate is not limited to the composite electrode.

The PDP of the present invention comprises the front plate shown in FIG. 2 and a color filter provided in the front plate. Specifically, a color filter is provided between the bus electrode 5 and the first dielectric layer 6a, in a dielectric layer, that is, between the dielectric first layer 6a and the dielectric second layer 6b, between the dielectric second layer 6b and the protective layer 7, or on the transparent substrate (and between the transparent substrate and the electrode).

Specifically, according to a first embodiment of the present invention, a color filter is formed on a transparent substrate so as to cover an electrode (a transparent electrode and a bus electrode). In this embodiment, since the color filter may be formed after the formation of the electrode, the problem of breaking of the electrode attributable to the difference in level created by the color filter is not posed.

According to second and third embodiments of the present invention, a color filter is provided in the dielectric layer or between the dielectric and the protective layer. Therefore, the color filter is provided on a flat surface, and no problem associated with breaking of the electrode attributable to the difference in level is caused, making it possible to prepare PDP having more stable-properties.

Further, according to a fourth embodiment, a color filter is provided directly on the transparent substrate of the front plate and between the transparent substrate and the electrode. In this embodiment, the problem of breaking of the electrode attributable to the difference in level created by the color filter can be eliminated when the thickness of the color filter is less than 2 $\mu$m, preferably not more than 1 $\mu$m. Such a thin-film color filter can be formed using ultrafine particles of an inorganic pigment which will be described later.

The construction of PDP according to the present invention will be described.

For example, a glass plate having a thickness of about 2 to 4 mm is preferably used as the transparent substrates 1 and 2.

The transparent electrode 4 is an electrode which, upon application of a high-voltage pulse voltage for lighting of a panel, produces and maintains a discharge plasma. It should have transparency (including permeability to light) in order to efficiently release display light produced within the discharge cell into the outside of the panel. For example, it may comprise ITO, $SnO_2$, ZnO or the like.

The bus electrode 5 is an electrode which functions to supply a high-voltage pulse voltage for lighting to the above electrode without attenuation and is made of preferably a low-resistance material. For example, it may comprise Cr, Cu, Al, Ag, Au or the like.

In the present embodiment, a composite electrode comprising the transparent electrode 4 and the bus electrode 5 is used. However, the electrode is not limited to the composite electrode when a single material capable of functioning both as the transparent electrode and the bus electrode is used.

The dielectric layer 6 is a layer which accumulates electrostatic charge produced by discharge plasma and forms the so-called "wall discharge" and is formed of preferably a material having transparency and insulating properties. For example, it may be formed by coating a low-melting glass paste and firing the coating.

The protective layer 7 is a layer which functions to prevent sputtering of the dielectric layer by discharge plasma and is formed of preferably a material having transparency and good secondary emission. For example, it may be formed of MgO, CeO or the like.

Figure 1:
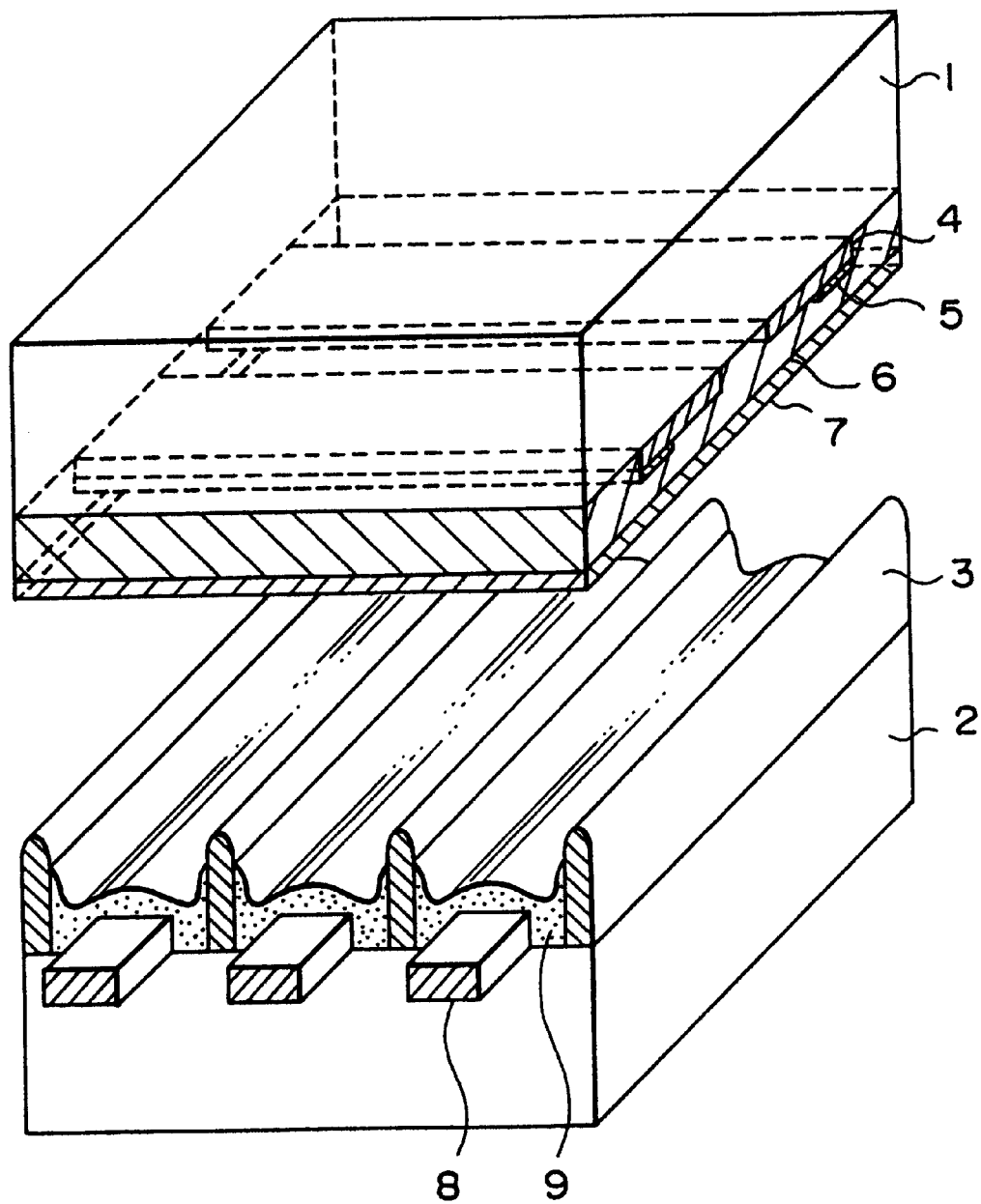
FIG. 1 is a structural diagram showing an embodiment of the construction of an AC type plasma display panel, with a front plate and a back plate being shown separately from each other.

On the other hand, as shown in FIG. 1, the back plate provided opposite to the front plate comprises a transparent plate 2, barrier ribs 3 provided at given intervals on the transparent substrate 2, and an address electrode 8 and a phosphor 9 disposed within cells defined by the barrier ribs 3. Thus, a plurality of cells as a display element are defined, by the barrier ribs 3, between the front plate and the back plate. The address electrodes 8 are provided parallel within respective cells, and the phosphor 9 is provided so as to cover the wall surface of the barrier ribs 3 and the bottom face of the cells. The address electrode 8 is an electrode for applying a high-voltage pulse voltage based on display data to the display cells.

The formation of the color filter will be described in more detail.

Any of heat-resistant pigments may be used as the colorant of the color filter for PDP. In this case, preferably, the colorant can withstand about 450 to 600°C. although the heat resistance requirement depends upon the substrate production process. Further, a color glass which can ensure wavelength selectivity in a small thickness can also be used as the colorant in the present invention. Further, incorporation of a low-melting glass frit into the colorant is also useful for improving the color development, stability of the developed color, heat resistance, adhesion, and surface smoothness.

There are many heat-resistant pigments, and representative examples thereof include iron (red), manganese aluminate (pink), gold (pink), antimony-titanium-chromium (pink), iron-chromium-zinc (brown), iron (brown), titanium-chromium (yellowish brown), iron-chromium-zinc (yellowish brown), iron-antimony (yellowish brown), antimony-titanium-chromium (yellow), zinc-vanadium (yellow), zirconium-vanadium (yellow), chromium (green), vanadium-chromium (green), cobalt (blue), cobalt aluminate (blue), vanadium-zirconium (blue), and cobalt-chromium-iron (black). It is also possible to mix of two or more of them to adjust the color tone. Further, the proportion of particles having a diameter of not less than 1 $\mu$m is not more than 10% by weight based on the total weight of the particles. This is because when the proportion of particles having a large diameter is high, the transmittance is lowered resulting in deteriorated brightness. Further, the proportion of particles having a diameter of 0.01 to 0.7 $\mu$m is preferably not less than 20% by weight based on the total weight of the particles. More preferably, the use of pigments having a diameter of 0.001 to 0.2 $\mu$m results in further improved light transmittance and evenness.

There are many types of color glass with respect to coloring mechanism. Further, even when the same raw material is used, the color varies depending upon conditions. One example of the frit is composed mainly of a potash-lead glass containing silicic acid ($SiO_2$), lead oxide (PbO), potassium oxide ($K_2O$), boric acid ($B_2O_3$), aluminum fluoride ($AlF_3$), and arsenic oxide ($As_2O_3$). Raw materials usable herein include silica, minium, yellow lead oxide, white lead, potassium nitrate, boric acid, borax, sodium bicarbonate, and fluorides. The raw material is combined and mixed with a colorant, such as arsenious acid (white), tin oxide (white), copper oxide (green), cobalt oxide (blue), potassium bichromate, antimony oxide (yellow), iron oxide (brown), manganese dioxide (purple), nickel oxide (purple), gold chloride (red), sodium uranate, or selenium red (vermillion). The mixture is heat-melted and vitrified, and the vitrified product is cooled and ground to prepare a color glass.

The color filter may be formed by providing, as a paste material, a color glass paste or a glass paste with an inorganic pigment dispersed therein, patterning the paste material by screen printing, and firing the pattern. Alternatively, it may be formed by photolithography, that is, by providing, as a paste material, a photosensitive paste comprising a color glass paste with a photosensitive resin added thereto or a dispersion of an inorganic pigment in a glass paste with a photosensitive resin added thereto, coating the paste material, exposing the coating through a mask, developing the exposed coating to conduct patterning, and then firing the pattern to prepare a color filter.

In the provision of the color filter, using the above color glass, between the electrode and the dielectric layer or between the dielectric layers, when the softening point of the dielectric layer is above the softening point of the color glass frit, the diffusion of the coloring component into other adjacent color layer(s) can be advantageously prevented. Firing in the temperature range of from (the softening point of the glass frit of the dielectric layer +40° C.) to (the softening point of the glass frit of the dielectric layer −40° C.) can also advantageously prevent the color component being diffused into other adjacent color layer(s).

The formation of the color filter constituted by a layer formed of ultrafine pigment particles will be described.

As described above, according to a fourth embodiment of the present invention, a color filter is formed directly on the transparent substrate of the front plate and between the transparent substrate and the electrode. In this embodiment, when the thickness of the color filter is less than 2 $\mu$m, preferably 1 $\mu$m, the problem of breaking of the electrode attributable to the difference in level created by the color filter can be solved. The above ultrathin film color filter may be formed by using ultrafine particles, of an inorganic pigment, having an average particle diameter of 0.001 to 0.2 $\mu$m. The ultrathin color filter formed of the ultrafine particles of an inorganic pigment has particularly excellent evenness and transparency (light transmittance). The ultrathin color filter may be applied also to the above first and third embodiments.

In the above method, the color filter may be formed by patterning a paste of a dispersion of the ultrafine particles of an inorganic pigment in a binder by screen printing, firing the pattern, and forming thereon a protective layer formed of a transparent glass paste. Alternatively, it may be formed by using a photosensitive paste of a dispersion of the ultrafine particles of an inorganic pigment in a photosensitive resin. In any event, in the patterned paste, the binder component vanishes by heat applied during firing to form a predetermined color filter pattern formed of ultrafine particles of an inorganic pigment. Although this pattern per se is fragile, the formation of a protective layer, for the color filter, formed of a transparent glass paste, on the pattern results in further improved flattening of the color filter pattern.

When a protective layer for a color filter is formed on the color filter formed of ultrafine particles of an inorganic pigment, firing at a temperature about 100° C. above the softening point of the glass frit as in the prior art causes breaking of the color filter pattern. Therefore, care should be paid to the firing temperature. Preferably, the firing is carried out in the temperature range of from (the softening point of the glass frit as the material for the color filter protective layer +40° C.) to (the softening point of the above glass frit −40° C.).

When the color filter is formed using the ultrafine particles of an inorganic pigment, a thin-film color filter having a thickness of about 0.3 to 1 $\mu$m can be formed, enabling breaking or the like of the electrode to be prevented even in the formation of a color filter orthogonal to the electrode on the underside of the electrode, which has been difficult in the prior art. As described above, the color filter using ultrafine particles of an inorganic pigment may be, of course, formed between the electrode and the dielectric layer, within the dielectric layer, or between the dielectric layer and the protective layer. Thus, a color filter can be provided which has high evenness and light transmittance. Further, a layer may serve both as the protective layer for the color filter and the dielectric layer.

EXAMPLE 1

In the present example, a color filter is formed between a bus electrode 5 and a dielectric first layer 6a. Three color glass pastes of three colors of red, green, and blue were used as a paste material and patterned by screen printing on a glass substrate 1 with a transparent electrode 4 and a bus electrode 5 formed thereon, and the pattern was fired to form a color filter. Color glass pastes used in this example are tabulated in Table 1. The color glass paste of each color listed in Table 1 comprised a transparent color glass component (50–90 wt %) comprising a color component of at least one of a metal, a metal oxide, an ion, and a colloid and corresponding to each of the above colors by virtue of ion coloring or colloid color development and an organic vehicle (10–50 wt %) prepared by kneading ethyl cellulose with terpineol. A 300-mesh screen plate was used. For the glass paste of each color, prior to use thereof, an organic vehicle was suitably added to the glass paste to regulate the viscosity of the paste at about 200 to 1000 poises.

TABLE 1

| Color | Color glass paste (trade name) |
| --- | --- |
| Red | Transparent color D-77407 (red), T & D CERATEC CO., Ltd. |
| Green | Transparent color D-11699 (green), T & D CERATEC CO., Ltd. |
| Blue | Transparent color D-12601 (blue), T & D CERATEC CO., Ltd. |

A belt type firing oven was used for the firing. In the firing, a heat gradient of 350 to 580° C. was provided, firing was carried out at 580° C. for at least 20 min with the total firing time being 120 min. The belt speed was 80 mm/min. Alternatively, the firing may be carried out using a batch type firing oven, with the firing temperature and time being respectively 600° C. and 15 min.

A colorless and transparent glass paste (PLS-3162S, manufactured by Nippon Electric Glass Co., Ltd.) was printed on the whole surface of the color filter by screen printing using a 300-mesh plate, and the print was fired to form a dielectric layer 6 (the layers 6a and 6b being continuous to constitute a single-layer structure). A protective layer 7 was formed on the whole surface thereof.

Figure 3:
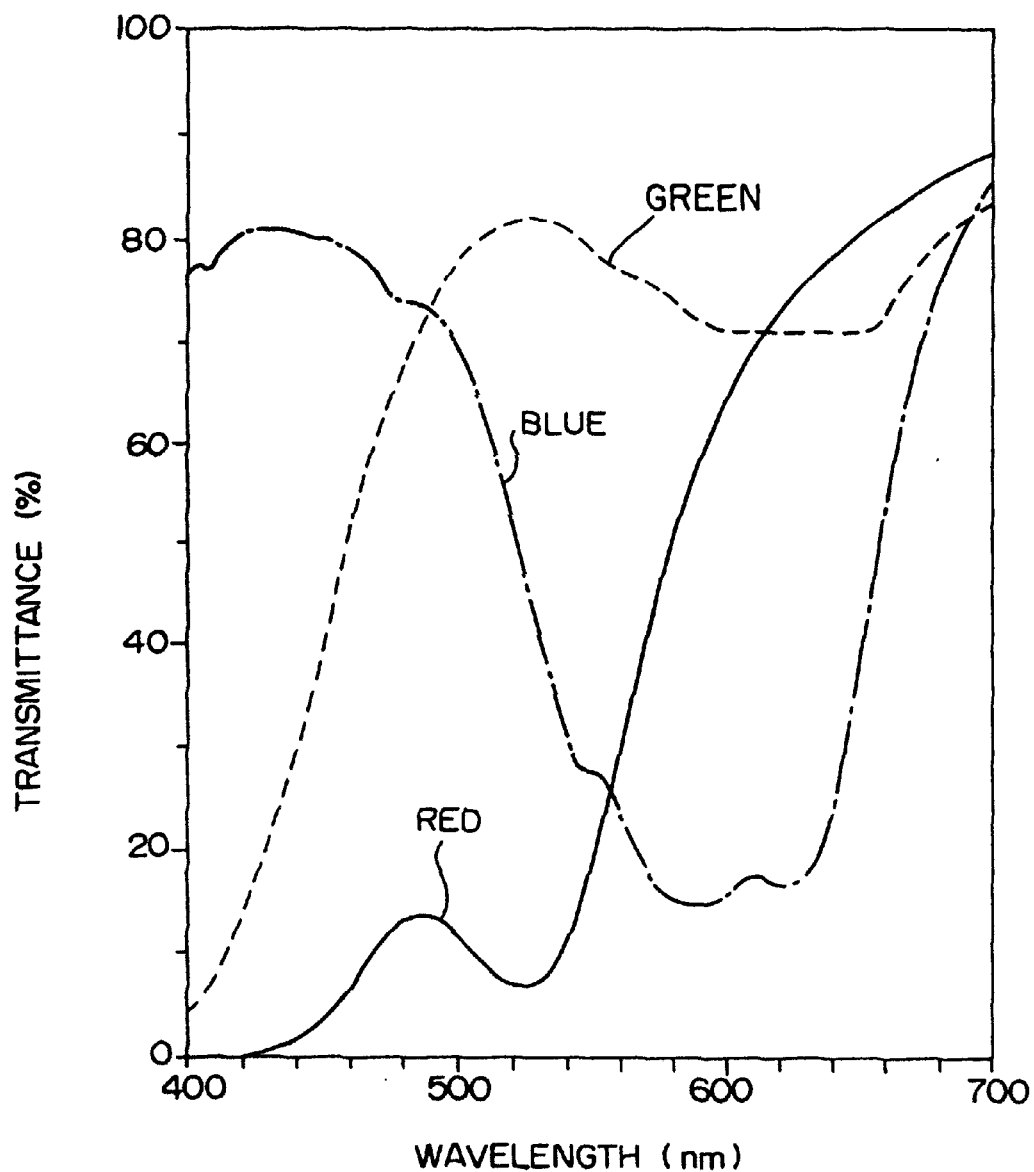
FIG. 3 is a graph showing a transmission spectrum of a color filter prepared in Example 1.

The transmission spectrum of the color filter thus obtained is shown in FIG. 3. In general, the luminescent peak wavelength of phosphors used in PDP is in the range of from 590 to 620 nm for red, in the range of from 500 to 540 nm for green, and in the range of from 430 to 460 for blue. As can be seen from FIG. 3, for filters of respective colors in the present example, the transmittance in the above wavelength region is about 80%, indicating that the filter properties were good.

EXAMPLE 2

The softening point of the color glass frit of the color glass pastes for the color filter used in Example 1 was 550° C. for red, 480° C. for green, and 480° C. for blue. On the other hand, the dielectric layer 6 formed on the color filter had a softening point of 475° C.

In the present example, instead of the dielectric layer in Example 1, WX-0045 (softening point 600° C.) manufactured by T & D CERATEC was used, and the firing was conducted at 600° C.

Since the softening point of the dielectric layer was higher than that of the color glass frit, the diffusion of the color component of each color into the adjacent dielectric layer could be prevented, providing a color filter having better line width accuracy and contrast than that prepared in Example 1.

EXAMPLE 3

The procedure of Example 1 was repeated, except that two layers were formed as the dielectric layer. Specifically, a color filter was formed on an electrode in the same manner as in Example 1, and the dielectric layer was formed in the same manner as in Example 1, except that PLS-3232 (softening point 585° C.) manufactured by Nippon Electric Glass Co., Ltd. was used for a first dielectric layer and PLS-3162S (softening point 475° C.) manufactured by Nippon Electric Glass Co., Ltd. was used for a second dielectric layer.

Since, as with Example 2, the softening point of the first dielectric layer was higher than that of the color glass frit of the color filter, the diffusion of the color component could be prevented. Further, since the softening point of the second dielectric layer was low, the irregularities on the surface of the dielectric layer could be reduced resulting in improved evenness.

EXAMPLE 4

In the present example, a color filter was formed between the first dielectric layer 6a and the second dielectric layer 6b. The first dielectric layer 6a was formed by subjecting a colorless and transparent glass paste (PLS-3162S, manufactured by Nippon Electric Glass Co., Ltd.) to screen printing (solid printing) using a 300-mesh plate. A color filter was formed by providing paste materials comprising colorless and transparent glass pastes, listed in Table 2, with pigments dispersed therein, coating them on the first dielectric layer 6a by screen printing, and firing the coatings. The paste material for each color was prepared by reducing the particle size of the pigment to about 0.01 to 0.5 μm by means of a paint shaker and kneading the inorganic pigment having the reduced size (10–20 wt %) with a colorless and transparent glass paste (80–90 wt %) by means of a three-roll mill for 20 to 30 min. Further, a second dielectric layer 6b was formed using the same material and in the same manner as used above in the formation of the first dielectric layer. The printing conditions and the firing conditions were the same as those used in Example 1. The step of firing may be conducted each time after printing of each layer, or alternatively may be conducted by simultaneous firing after the formation of the layers in a dried state.

TABLE 2

| Color | Pigment (trade name) | Colorless and transparent glass paste |
| --- | --- | --- |
| Red | Transparent iron oxide TOR (powder of acicular αFe$_2$O$_3$), Dainichiseika Color & Chemicals Manufacturing Co., Ltd. | PLS-3162S, Nippon Electric Glass Co., Ltd. |
| Green | TM green No. 3330 (Co—Al—Cr—Ti) Dainichiseika Color & Chemicals Manufacturing Co., Ltd. | PLS-3162S, Nippon Electric Glass Co., Ltd. |
| Blue | TM blue No. 3450 (Co—Al) Dainichiseika Color & Chemicals Manufacturing Co., Ltd. | PLS-3162S, Nippon Electric Glass Co., Ltd. |

Figure 4:
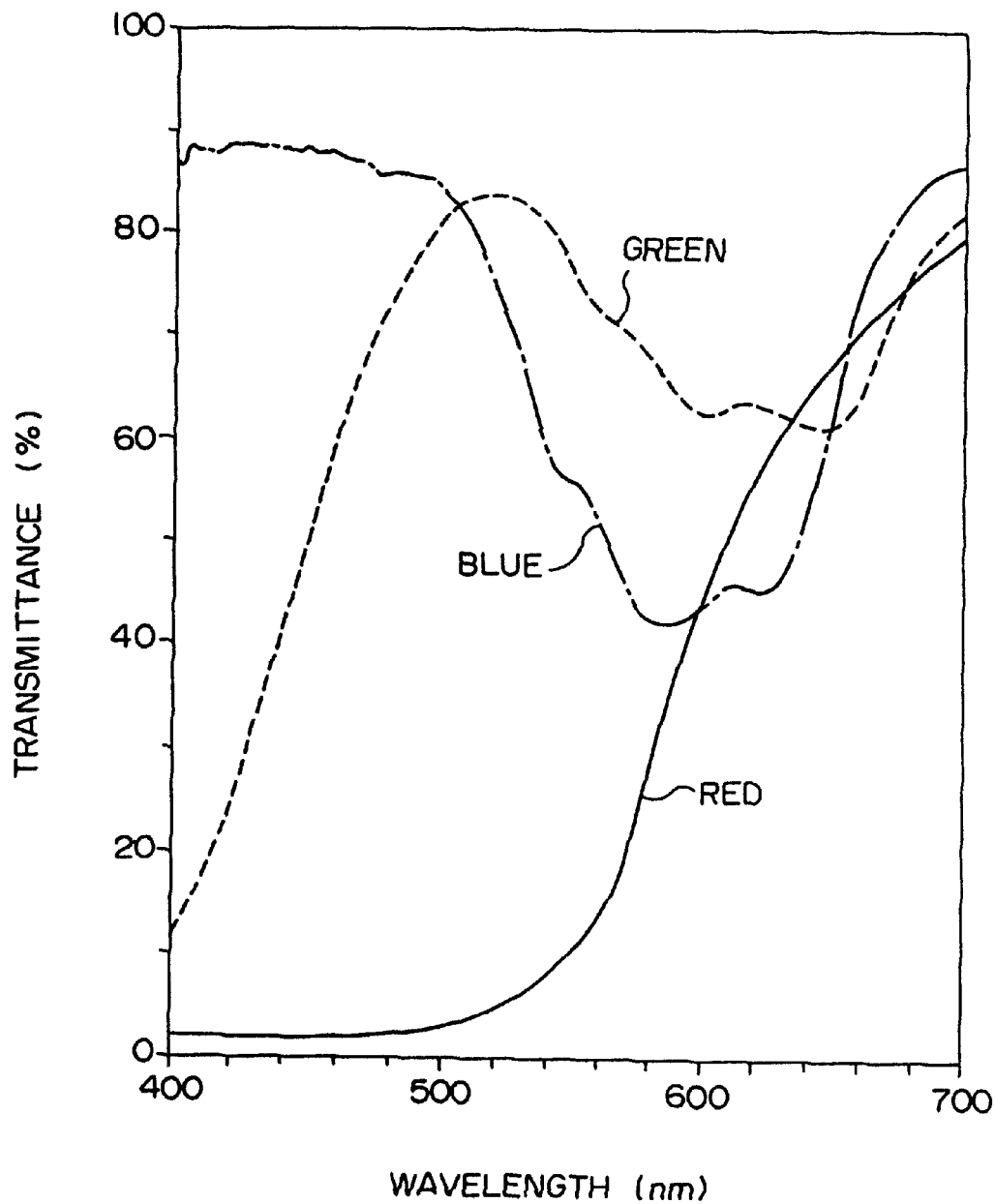
FIG. 4 is a graph showing a transmission spectrum of a color filter prepared in Example 2.

The transmission spectrum of the color filter thus obtained is shown in FIG. 4. In general, the luminescent peak wavelength of phosphors used in PDP is in the range of from 590 to 620 nm for red, in the range of from 500 to 540 nm for green, and in the range of from 430 to 460 for blue. As can be seen from FIG. 4, for filters of respective colors in the present example, the transmittance in the above wavelength region is about 60 to 80%, indicating that the filter properties were substantially good.

EXAMPLE 5

In the present example, a color filter was formed between the first dielectric layer 6a and the second dielectric layer 6b. In this case, a dielectric paste having a smaller shrinkage upon firing was used for the formation of the first dielectric layer 6a, and a dielectric layer having a higher shrinkage upon firing was used for the formation of the second dielectric layer 6b. This reduces irregularities on the surface of the dielectric layer, and, at the same time, the effect of preventing breaking of the electrode is better than that attained by the formation of the dielectric layers using an identical material. Specifically, the first dielectric layer 6a was formed by subjecting a colorless and transparent glass paste (PLS-3232, manufactured by Nippon Electric Glass Co., Ltd.) to screen printing (solid printing) using a 300-mesh plate. A color filter was formed thereon by screen printing using the same pastes as used in Example 4. Further, a second dielectric layer 6b was formed by subjecting a colorless and transparent glass paste (PLS-3162S, manufactured by Nippon Electric Glass Co., Ltd.) to screen printing (solid printing) using a 300-mesh plate. As with Example 4, the step of firing may be conducted each time after printing of each layer, or alternatively may be conducted by simultaneous firing after the formation of the layers. The transmission spectrum of the color filter thus obtained was equivalent to that shown in FIG. 3.

EXAMPLE 6

In the present example, a color filter was formed between the dielectric layer 6 and the protective layer 7. The dielectric layer 6 (the layers 6a and 6b being continuous to constitute a single-layer structure) was formed by subjecting an identical colorless and transparent glass paste (PLS-3162S, manufactured by Nippon Electric Glass Co., Ltd.) to screen printing (solid printing) using a 300-mesh plate. A color filter was formed thereon using the same glass pastes as used in Example 1. A MgO layer was formed thereon as a protective layer 7 by vapor deposition. The protective layer 7 may be formed by sputtering or sol-gel process. The transmission spectrum of the color filter thus obtained was equivalent to that shown in FIG. 3.

As described above, according to the present invention, in the provision of a color filter in a front plate of PDP, the color filter is provided on an electrode, within a dielectric layer, or on the dielectric layer, enabling PDP having a color filter to be produced without any trouble, associated with the formation of the electrode, such as breaking of the electrode and unacceptable edge shape.

EXAMPLE 7

In the present example, a color filter is formed between a glass substrate and an electrode. In order to prevent breaking of the electrode at the difference in level by the formation of a color filter orthogonal to the stripe of the electrode, under the electrode, in the present example, a not more than 1 μm-thick color filter is formed using ultrafine particles of an inorganic pigment.

At the outset, a photosensitive material containing a black pigment was coated on a glass substrate, and the coating was exposed through a mask and developed to form a stripe light-shielding layer. In this case, the selection of ultrafine particles of a pigment having the same particle diameter as that of the following pigment used in the color layer, that is, ultrafine particles of a pigment having a diameter of 0.001 to 0.2 μm, is preferred.

Then, inks for color layers were prepared. At the outset, terpineol and additives were added to and dispersed in the following ultrafine particles of pigments. Further, ethyl cellulose as a binder and terpineol were added thereto, and kneading was conducted by means of a three-roll mill to prepare inks for color layers.

| Color | Ultrafine particles of pigment |
|-------|-------------------------------|
| Red   | $Fe_2O_3$, average particle diameter 0.036 μm |
| Green | $Co(Al.Cr)_2C_4$, average particle diameter 0.036 μm |
| Blue  | $CoAl_2O_4$, average particle diameter 0.06 μm |

The above color inks were printed by screen printing in the portions for forming respective colors between stripes in the light-shielding layer. The print was fired by means of a belt type firing oven at 580° C. for 20 min, thereby forming a 1 μm-thick color filter.

A protective layer for the color filter was formed on the color filter. Specifically, a colorless and transparent glass paste (PLS-3232 (softening point 585° C.), manufactured by Nippon Electric Glass Co., Ltd.) was printed on the whole surface of the color filter by screen printing, and the print was fired at 600° C., substantially the same temperature as the softening point of the glass paste, thereby forming a 10 μm-thick protective layer for the color filter.

The evenness of the color filter thus obtained was 0.5 μm in terms of the maximum roughness $R_{max}$.

An electrode was formed thereon. At the outset, a 1500 to 2000 Å-thick ITO was formed on the whole surface by sputtering or vapor deposition. Then, a bus electrode was formed on the ITO film. The bus electrode may be formed by printing a paste containing metallic particles or by using a photosensitive paste. In this example, a thin film electrode having a three layer structure was formed. Specifically, metallic thin films of Cr (500 Å), Cu (10000 Å), and Cr (2000 Å) were successively formed by sputtering or vapor deposition. Then, a photoresist was coated, exposed, and developed to form a mask, followed by etching of a metallic electrode. A mask was again formed using a photoresist, and ITO was etched to form a maintenance electrode and a bus electrode.

A colorless and transparent glass paste ("PLS-3152" (softening point 600° C.), manufactured by Nippon Electric Glass Co., Ltd.) was printed and fired on the substrate, with the color filter and the electrode formed thereon, in the same manner as in the other examples to form a dielectric layer, and a protective layer (MgO layer) was formed by vapor deposition, thereby preparing a front plate for a plasma display panel.

Figure 5:
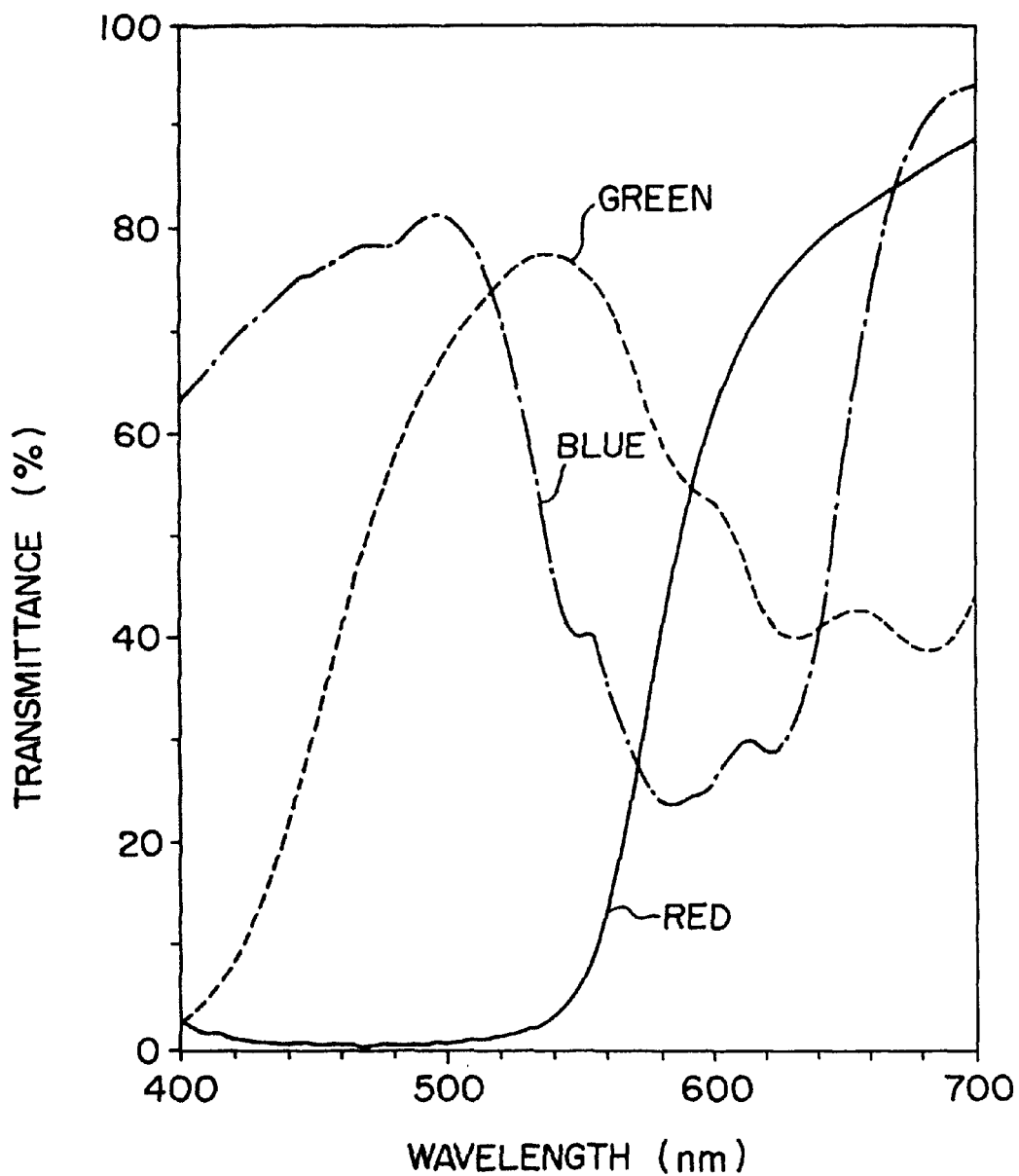
FIG. 5 is a graph showing a transmission spectrum of a color filter prepared in Example 5.

The transmission spectrum of the color filter thus obtained is shown in FIG. 5. In general, the luminescent peak wavelength of phosphors used in PDP is in the range of from 590 to 620 nm for red, in the range of from 500 to 540 nm for green, and in the range of from 430 to 460 nm for blue. As can be seen from FIG. 5, filters of respective colors in the present example had good filtration properties.

For the front plate thus obtained, the color filter had a good evenness of 0.5 μm in terms of the maximum roughness $R_{max}$ and the front panel was free from breaking of the electrodes, unacceptable edge shape and other unfavorable troubles.

Separately, a primer layer formed of a glass paste was optionally formed on a glass substrate, address electrodes orthogonal to the above electrodes and parallel to the color filter were formed, barrier ribs parallel to the address electrodes were formed by sand blasting or the like, and a phosphor was filled into cells defined by the barrier ribs to prepare a back plate.

The front plate and the back plate thus obtained were hermetically sealed, and a rare gas, such as Ne or Xe, was sealed to prepare a plane-discharge AC type plasma display panel.

I claim:

1. A plasma display panel comprising:

a front plate; and a back plate disposed parallel and opposite to the front plate, wherein the front plate comprises a transparent substrate for the front plate, electrodes provided at a given interval on the transparent substrate, a dielectric layer provided to cover the electrodes, and a protective layer provided on the dielectric layer, the back plate comprises a transparent substrate for the back plate and barrier ribs provided at given intervals on the transparent substrate, the barrier ribs defining a plurality of cells as a display element, and a color filter is provided between the dielectric layer and the protective layer on the front plate.

* * * * *